Patented Oct. 11, 1938

2,133,116

UNITED STATES PATENT OFFICE 2,133,116

PROCESS OF VULCANIZING RUBBER

Walther Schrauth, Berlin-Dahlem, Germany, assignor to Deutsche Hydrierwerke Aktiengesellschaft, Berlin-Charlottenburg, Germany, a corporation of Germany No Drawing. Application November 30, 1934, Serial No. 755,419. In Germany January 8, 1929

3 Claims. (Cl. 18—53)

The present invention relates to the manufacture of rubber and has for an object to provide an improved rubber composition.

It has been found in accordance with the present invention that the quality of the vulcanized rubber produced whether made from raw or regenerated rubber is considerably improved by an addition to the rubber mass prior to vulcanization of esters of cyclic alcohols with organic acids.

The action of the esters in improving the rubber is not completely understood. Probably it is due in part to the fact that these esters act as dispersing agents to improve the distribution of the various ingredients throughout the rubber mass. These esters furthermore act as solvents to a greater or less extent for both the rubber and certain of the added ingredients, notably the accelerators, and thereby facilitate intimate contact therebetween.

The esters used may be the esters of the cyclic alcohols with organic mono- or di-carboxylic acids. The alcohols include for example the terpene alcohols, such as borneol, terpineol and fenchyl alcohol, the aromatic, hydro-aromatic and hydro-cyclic mono- and poly-nuclear alcohols such as cyclo-hexanol, methyl-cyclo-hexanol, deca-hydro-naphthol, benzyl, phenyl-ethyl, cinnamyl, naphthenic, tetra-hydro-furfuryl, etc. alcohols.

The acids may include the straight chain, higher molecular, saturated and unsaturated aliphatic acids, including the hydroxy acids, having 6 to 30 carbon atoms in the molecule. The acids may be single acids such as the lauric, palmitic, stearic, oleic, ricinoleic or their homologues or mixtures of such acids as the mixture of acids obtained from cocoanut oil, palm kernel oil, linseed oil, sperm oil, soya bean oil, or other natural fats or waxes. The acids may be dibasic aliphatic acids having 2 to 30 carbon atoms in the molecule including for example, oxalic, malonic, succinic, maleic, fumaric, adipic, suberic, sebasic, tartaric, malic, or aromatic mono- or poly-nuclear acids such as benzoic, toluic, cinnamic, naphthoic, or dibasic cyclic acids, such as phthalic, hydro-phthalic, or resinic acids such as abietic, and the homologues of the several acids mentioned.

Esters which are particularly practicable in the practice of the invention are for example the borneyl ester of adipic acid, the cyclo-hexyl and the methyl cyclo-hexyl esters of palmitic acid or of the mixture of acids obtained from cocoanut oil or palm kernel oil, the dimethyl-cyclohexyl ester of oleic acid, the cyclohexyl ester of abietic acid, the decahydro-β-naphthyl ester of lauric acid, the terpineol ester of sebasic acid, the naphthenyl ester of hydro-phthalic acid, the fenchyl ester of cinnamic acid, the benzyl ester of oxalic acid, the cyclohexyl ester of benzoic acid.

The proportion of the esters added may vary within wide limits. Ordinarily the ester added may be of the order of 0.1 to 10% of the weight of the complete mass and preferably it will be between 0.25 and 2.5%. The esters may be added to the rubber with the accelerator, coloring matter or other loading material or they may be first mixed with the addition materials and the mixture thus prepared may then be added to the rubber.

The several esters may all be prepared in accordance with the well-known procedures. For example, they can be prepared by the direct reaction of the acids with the alcohols by heating a mixture thereof in the presence of sulfuric acid or hydro-chloric acid. They can be prepared by re-acting a salt of the acid such as the sodium or potassium salt with a chloride of the alcohol.

For example, to produce the borneol esters of cocoanut oil fatty acids, the fatty acid mixture obtainable by saponifying cocoanut oil is converted in the usual way with phosphorus pentachloride into the corresponding fatty acid chlorides which are purified by means of vacuum distillation. They are then caused to re-act with the appropriate quantity of borneol corresponding to their saponification number. The alcohol should preferably be present in excess of the amount stoichiometrically indicated by about 25%. The several terpene-alcohol esters of palm kernel oil fatty acids, of cocoanut oil fatty acids or of other fatty acids can be obtained in a similar manner and are suitable for use for the purposes of this invention.

Terpene alcohol esters of the naphthenic acids may be produced as follows:—To one molecular proportion of naphthenic acid is added a little more than one molecular proportion of thionyl chloride and the whole is warmed in a water bath to about 40° C., after which, after distilling off the excess thionyl chloride, naphthenic acid chloride remains. This is then treated in the usual manner at a temperature of about 90–100° C. with the alcohol, terpineol or other terpene alcohol, to form the ester.

The cyclohexyl ester of abietic acid may be prepared by heating one molecular proportion of abietic acid ethyl or butyl ester with one molecular proportion of cyclohexyl alcohol in the presence of $\frac{1}{10}$ molecular proportion of sodium metal until ethyl- or butyl alcohol no more distils. The residue left after distillation is washed with water until neutral reaction occurs and then distilled in vacuo.

The esters of any of the cyclic alcohols with the dibasic acids may be prepared by mixing the dibasic acid with the cyclic alcohol. The alcohol should be present in excess of the amount stoichiometrically indicated by about 25%. The mixture is heated until the water of reaction no more distils with the alcohol left over. After that the reaction product is distilled in vacuo.

The following examples will serve to illustrate the invention.

Example 1

A homogeneous vulcanizable mass may be produced by combining 80 parts by weight of hevea-crepe, 32 parts inert material, 3 parts sulphur, 16 parts cyclo-hexyl-ester of adipic acid or cyclo-hexyl-ester of lauric acid and 1½ parts of an accelerator, for example di-ethyl-dithio-carbamic acid. This mass may then be vulcanized in accordance with usual procedure for three-quarters of an hour at 132° C.

Example 2

In the same manner as described in Example 1, 100 gr. hevea-crepe, 25 gr. pentasulfide of antimony, 4 gr. sulphur, 20 gr. of cyclo-hexyl-ester of hexa-hydro-phthalic acid or menthyl-ester of benzoic acid and 2 grs. of an accelerator such for example as phenylendiamin are thoroughly mixed on the mixing rolls and vulcanized for forty minutes at 133° C.

Example 3

Similarly, 50 gr. hevea-crepe, 2 gr. sulphur, 20 gr. chalk, 1 gr. accelerator, f. i. dimethylamin-di-methyl-dithiocarbamate and 8 gr. methyl-cyclo-hexanol ester of palmitic acid or terpineol ester of naphthenic acid are mixed in the vulcanization press and vulcanized for 35 to 40 minutes at 135° C.

There is some advantage in using the less volatile esters, for example those having a boiling point above 200° C.

The advantage of the use of the esters may be illustrated by the following test. Two mixtures of rubber were prepared as follows:—

|  | Compound I | Compound II |
| --- | --- | --- |
|  | Percent | Percent |
| Raw rubber | 86.8 | 86.8 |
| Coloring matter | 2.7 | 2.7 |
| Zinc oxide | 6.1 | 6.1 |
| Mineral wax | 1.5 | 1.5 |
| Sulphur | 2.7 | 2.7 |
| Accelerator | 0.2 | 0.2 |
| Methyl-cyclo-hexyl palmitate |  | 0.9 |
|  | 100.0 | 100.9 |

The two compounds were vulcanized for 30 minutes at 130° C. in electrically heated molds and the material tested for tensile strength and elongation with the following results:—

|  | Tensile strength | Elongation |
| --- | --- | --- |
|  | Kgs. per sq. cc. | Percent |
| Compound I | 166 | 742 |
| Compound II | 188 | 750 |

This application is in part a continuation of applicant's co-pending application Serial No. 337,730, filed February 5th, 1929.

What I claim is:—

1. In the process of vulcanizing rubber and rubber compounds the improvement which consists in adding to the mass to be vulcanized methyl-cyclo-hexyl ester of the mixture of the acids obtained from cocoanut oil.

2. The product produced by the process defined in claim 1.

3. In the process of vulcanizing rubber, the improvement which consists in adding to the mass to be vulcanized methyl cyclo hexyl ester of a straight chain aliphatic acid having 6 to 30 carbon atoms in the molecule.

WALTHER SCHRAUTH.